United States Patent
Idzik et al.

(10) Patent No.: US 9,600,729 B2
(45) Date of Patent: *Mar. 21, 2017

(54) SYSTEM AND METHOD OF AUTHENTICATION OF AN ELECTRONIC SIGNATURE

(71) Applicant: BlackBerry Limited, Waterloo (CA)

(72) Inventors: Jacek Idzik, Kenilworth (CA); Cornel Mercea, Waterloo (CA); Andrew Ashraf Fergusson, St. Clements (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,100

(22) Filed: Mar. 7, 2016

(65) Prior Publication Data

US 2016/0253568 A1  Sep. 1, 2016

Related U.S. Application Data

(63) Continuation of application No. 13/923,761, filed on Jun. 21, 2013, now Pat. No. 9,280,219.

(51) Int. Cl.
*G06F 3/041* (2006.01)
*G06K 9/00* (2006.01)
(Continued)

(52) U.S. Cl.
CPC ....... *G06K 9/00865* (2013.01); *G06F 3/0346* (2013.01); *G06F 3/0383* (2013.01);
(Continued)

(58) Field of Classification Search
USPC ........ 345/173, 156, 179, 158, 168; 382/124; 178/19.02; 340/5.81
See application file for complete search history.

(56) References Cited

U.S. PATENT DOCUMENTS 6,324,920 B1  12/2001  DeSchrijver
8,546,706 B2 *  10/2013  Altman ................... G06F 3/011
178/19.02
(Continued)

FOREIGN PATENT DOCUMENTS

EP  0696019  2/1996

OTHER PUBLICATIONS

"Low-power sub-threshold design of secure physical unclonable functions"; IEEE Explore Digital Library; published 2010, retrieved on Oct. 18, 2015; pp. 43-48.

(Continued)

*Primary Examiner* — Thuy Pardo
(74) *Attorney, Agent, or Firm* — Jeffrey N. Giunta; Fleit Gibbons Gutman Bongini & Bianco P.L.

(57) ABSTRACT

A system and method supporting signature verification. An input signature from a contact point of a stylus at a touch-sensitive surface is received. At least one sensor detects a first set of characteristics of the input signature that represents how the stylus is used when a present security level is a first level, and a second set of characteristics is determined when a present security level is a second security level. The second set of characteristics is a subset of the first set with fewer characteristics than the first set. One of the first set of characteristics or the second set of characteristics is transmitted to a characteristic receiving device to permit the input signature to be authenticated as a function, at least in part, of the first set or the second set of characteristics.

25 Claims, 7 Drawing Sheets

(51) Int. Cl.
*G06F 3/038* (2013.01)
*G06F 3/0354* (2013.01)
*G06F 3/0346* (2013.01)
*G06K 9/22* (2006.01)

(52) U.S. Cl.
CPC ........ *G06F 3/03545* (2013.01); *G06F 3/0416* (2013.01); *G06K 9/222* (2013.01)

(56) References Cited

U.S. PATENT DOCUMENTS

| | | | |
|---|---|---|---|
| 2001/0056410 | A1 | 12/2001 | Ishigaki |
| 2003/0001818 | A1 | 1/2003 | Katagirl et al. |
| 2005/0180618 | A1* | 8/2005 | Black ................. G06F 3/03545 382/124 |
| 2011/0298723 | A1 | 12/2011 | Fleizach et al. |
| 2012/0007713 | A1* | 1/2012 | Nasiri ................... G06F 1/1694 340/5.81 |
| 2012/0306758 | A1* | 12/2012 | Marsden ............... G06F 21/316 345/168 |
| 2012/0313865 | A1 | 12/2012 | Pearce |
| 2013/0002531 | A1 | 1/2013 | Krahenbuhl et al. |
| 2013/0106754 | A1 | 5/2013 | Kukulski |
| 2013/0314381 | A1* | 11/2013 | Altman .................. G06F 3/011 345/179 |
| 2014/0327660 | A1* | 11/2014 | Maloney ................ G06Q 20/14 345/179 |
| 2014/0375573 | A1 | 12/2014 | Idzik et al. |

OTHER PUBLICATIONS

Kohn, Andreas; Extended European Search Report from related European Patent Application No. 13173304.0 dated Nov. 7, 2013.

Office Action dated Nov. 6, 2014, received for U.S. Appl. No. 13/923,761.

Office Action dated Feb. 27, 2015, received for U.S. Appl. No. 13/923,761.

Office Action dated Jun. 18, 2015, received for U.S. Appl. No. 13/923,761.

* cited by examiner

SYSTEM AND METHOD OF AUTHENTICATION OF AN ELECTRONIC SIGNATURE

FIELD OF TECHNOLOGY

The present disclosure relates generally to a system and method of authentication and specifically to a system and method of multi-factor authentication of an electronic signature using a stylus input.

BACKGROUND

Handwritten signatures are commonly used in payment operations today to verify that a purchaser or sender of money is authorized to make a transaction. It is important to verify the identity of the person performing the operation. Handwritten signatures are generally used to do this. However, handwritten signatures can easily be forged and it is difficult to truly authenticate other technologies, including the entering of a personal identification number (PIN). Recently, electronic signatures have become more common, including entering a signature on a digital surface.

Authentication of a person requesting access typically comprises comparing a signature image with a pre-stored image. Signatures can be copied with relative ease thus requiring multi factor authentication such as passwords, PIN entry and/or biometric scanners, including fingerprint or retina scans to positively identify the user. Multi-factor authentication can be cumbersome and confusing, requiring equipment and remembering of passwords.

Various styli are known. Typically, a stylus serves in conjunction with a scribing surface that is configured to work with the corresponding stylus. Generally speaking, a stylus is typically a hand-held writing tool that often (but not exclusively) has a pencil-like elongated form factor and that includes at least one pointed end configured to interact with a scribing surface. Using a stylus as an input mechanism offers a variety of advantages over a fingertip including the opportunity for increased precision as well as an expression modality that accords with the user's own past experience with a pencil or pen.

Together with a display, a stylus can at least serve to cause the display of a so-called electronic-ink line that tracks and corresponds to movement of the stylus on the scribing surface. Such an input modality permits the user to enter text or to draw an image.

In some cases, a device might be locked and require a password. This can be done via text entry, PIN entry, or biometric authentication.

Existing stylus-based modalities do not necessarily meet the needs of all users for accessing the device since an additional mode of authenticating a user is often needed.

BRIEF DESCRIPTION OF DRAWINGS

Reference will now be made, by way of example, to the accompanying drawings which show example implementations; and in which.

DETAILED DESCRIPTION

Figure 1:
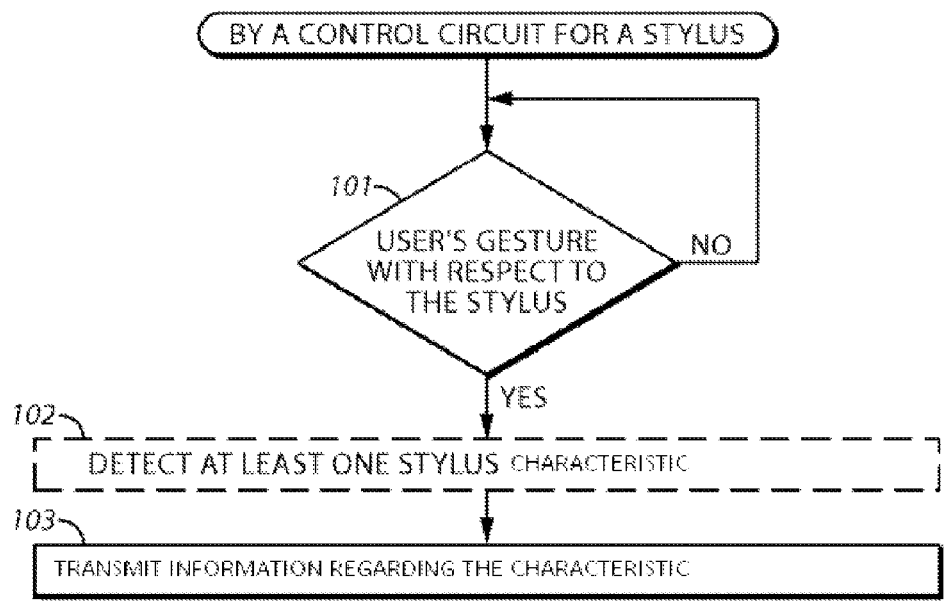
FIG. 1 is a flow diagram illustrating a method of the stylus, in accordance with an embodiment of the present disclosure.

The following describes an apparatus and method pertaining to detecting a user's input with respect to a stylus and wireless transmission of information regarding characteristics of the input. The input captures various characteristics extracted from profiles of the signature. The detected characteristics of the input can comprise, for example, the speed of the input or the angle of entry. This specification is directed to a system and method for authenticating a signature input through a writing instrument based on different properties of the profile of the signature. The signature is detected by accelerometer sensors present in the stylus, which is used as a writing instrument. Various characteristics of the input received through the stylus are detected by the stylus circuitry. The input is transmitted to a host authentication device which determines whether the user of the instrument is authenticated. An input receiving device is a device on which the stylus is in contact with or in proximity to while in use for signing. The input receiving device may have a touch-sensitive surface on the front, back, sides or corners of the device.

The host can be a secondary device or a server. Preferably the host is a mobile device such as a tablet writing surface upon which the stylus provides the input. The host may also be a smartphone. The host has a touch panel which receives the input from the stylus and contains a stylus sensor, such as a digitizer which converts the input into digital code. If the host is a secondary device, the writing surface will then wirelessly transmit the signature information to the secondary device. The secondary device may also be referred to as a characteristic receiving device. The stylus is an extension of the host and is in wireless communication with the host. There may also be a server in wireless communication with the host and remote storage. The remote storage may include a cloud service, a database, the internet, or another repository for storing information obtained from the host that may be retrieved upon request.

The input receiving device may, in some cases, be the same as the characteristic receiving device. For example, if the stylus is used to write or sign on a host, and the host itself saves the template information and performs the authentication, without reliance on an additional server, then the host is the input receiving device as well as the characteristic receiving device.

The digitizer is an electronic component within the host that wirelessly communicates with the stylus. The digitizer receives transmitted information from the stylus and based on the received information, the digitizer is able to determine the position of the stylus with respect to the host surface. The digitizer performs the tracking mechanism of the stylus since it is able to report the position of the stylus with respect to the surface of the host or screen surface. The digitizer may also report the position while the stylus is in hover mode, that is the stylus is in proximity to, for example within a few millimeters, but not touching the screen surface. The digitizer itself is housed within the host and electronically connected to the processor of the host.

The stylus itself may be active or passive. An active stylus emits a signal, via an antenna or transducer, and enables the system to listen passively. A passive stylus receives input through button events via a user sensor 204 retrieved through the digitizer or through the wireless link, through force applied to the stylus tip which is retrieved through the digitizer or through the wireless link, or through acceleration and rotation of the stylus body which is retrieved through the wireless link such as Bluetooth™ An active stylus can transfer data to the host in multiple ways in parallel such as by sending a full set of parameters over the Bluetooth™ link. It may also send only a specific element, such as a password, through the digitizer. The host will then compare the data received and perform a security check of the data received. Since the digitizer can retrieve the signal from the active stylus in close proximity, the host may determine that data was sent through the Bluetooth™ link by the active stylus that is in contact with the screen surface.

These teachings are also highly flexible in practice. As one example in these regards, the foregoing gesture information can be wirelessly transmitted along with other information. This other information can include, for example, information regarding one or more stylus operating circumstances (such as, but not limited to, a present angle of inclination of the stylus, rotation of the stylus about its longitudinal axis, and so forth).

These teachings are readily employed with any of a wide variety of stylus types including, but not limited to, capacitively-based styli, acoustically-based non-passive styli, magnetically-based non-passive styli, light-emitting-based non-passive styli, camera-based non-passive styli, radio-frequency-based non-passive styli, and so forth.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Figure 2:
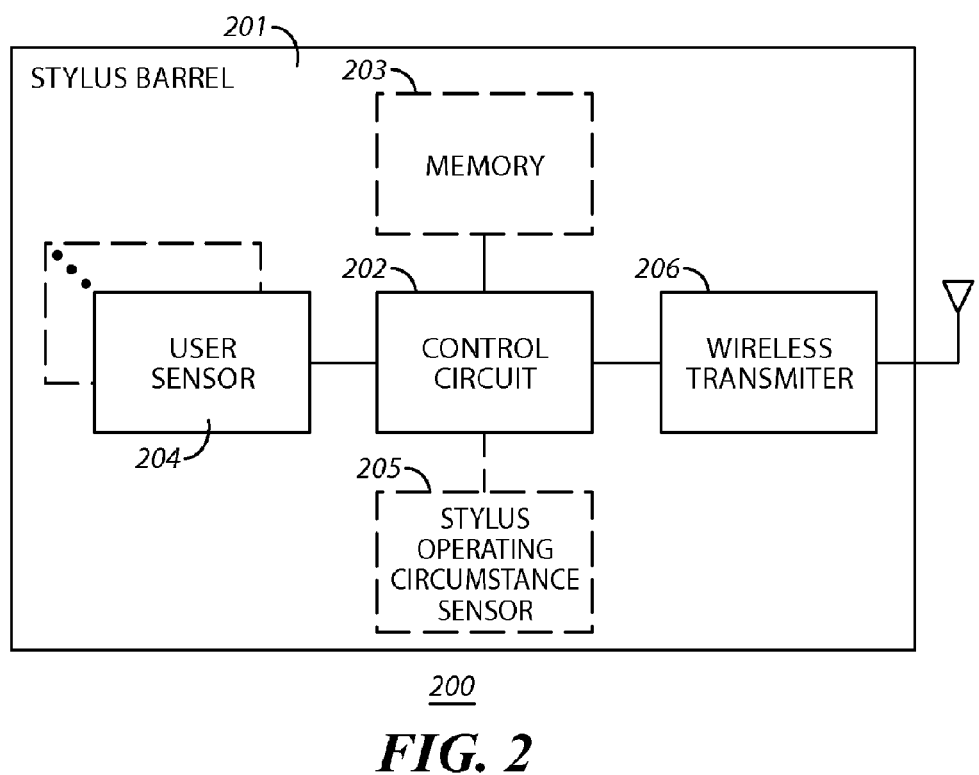
FIG. 2 is a block diagram of an example of a stylus barrel, in accordance with an embodiment of the present disclosure.

FIG. 1 presents a process 100 that accords at least in part with many of these teachings. For the sake of an illustrative example it will be presumed here that a control circuit for a stylus carries out this process 100. Again for the purpose of illustration and without intending any limitations in these regards, FIG. 2 presents an example of such a stylus 200. In particular, in this example, the stylus 200 includes a stylus barrel 201 that contains (at least in part) the aforementioned control circuit 202. In a typical application setting this stylus barrel 201 has a pen or pencil-like form factor and is shaped and configured to be comfortably grasped and manipulated by a user's hand. Styli barrels are well known in the art. As the present teachings are not overly sensitive to any particular selections in these regards, further elaboration regarding styli barrels is not provided here for the sake of brevity.

The control circuit 202 can comprise a fixed-purpose hard-wired platform or can comprise a partially or wholly programmable platform. These architectural options are well known and understood in the art and require no further description here. This control circuit 202 is configured (for example, by using corresponding programming as will be well understood by those skilled in the art) to carry out one or more of the steps, actions, and/or functions described herein.

By one optional approach the control circuit 202 operably couples to a memory 203. This memory 203 may be integral to the control circuit 202 or can be physically discrete (in whole or in part) from the control circuit 202 as desired. This memory 203 can serve, for example, to non-transitorily store the computer instructions that, when executed by the control circuit 202, cause the control circuit 202 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory, such as read-only memory (ROM) as well as volatile memory, such as Random Access Memory (RAM).

In this illustrative example the control circuit 202 also operably couples to one or more user sensors 204 and a wireless transmitter 206. The user sensor 204 is also supported by the stylus barrel 201 and is configured to detect at least one characteristic of the input of a user's gesture with respect to the stylus barrel 201 from a contact point of the stylus with a surface. By one approach, for example, the user sensor 204 can comprise one or more electrically-conductive sensors (including but not limited to capacitively-based sensors as are known in the art) and/or one or more optical-based sensors (including but not limited to an image-capture component such as a camera oriented to capture images of part or all of the user's hand and/or one or more fingers or thumb). (As used herein the expression "user sensor" will be understood to not comprise a mere button, slide switch, or the like.)

The aforementioned wireless transmitter 206 can also be supported by the stylus barrel. This wireless transmitter 206 can employ a radio-frequency carrier or an optical carrier (such as an infra-red carrier) as desired. Generally speaking, for most application settings this wireless transmitter 206 need only support a short-range technology (such as, but not limited to, the Bluetooth™ standard or the unlicensed cordless-microphone spectrum). A short-range approach will suffice for many application settings as the distance between the stylus 200 and its corresponding scribing surface/stylus sensor is usually on the order of less than only a very few inches. Other examples of possible short-range technologies include Near Field Communications (NFC), Infrared (rDA), Wi-Fi and other technology at wavelengths in between or a combination of technologies that would be known to a person skilled in the art.

NFC can be used to send characteristic information data determined by the stylus to the host. NFC can also be used to securely transmit a password in order to validate data. An active stylus can also transmit emitted signals over NFC.

In an alternate embodiment, NFC could be used by transmitting characteristic information by using a stylus on a surface that is different from the host. In this way, the stylus can capture characteristic information such as position, velocity, acceleration and tilt. Ultrasonic technology may also transmit information related to the vibration of materials when pressure is applied on it. The use of triangulation may assist the system in determining the location of the stylus with respect to the host device. Ultrasonic technology can send encrypted information in the frequency range of approximately 20-100 kHz.

In an alternate embodiment, a plurality of additional sensors may be placed on the back cover of a host device, on the corners of the host device, or on the sides of the host device. The orientation of the device may be determined by the sensors embedded therein, and any of the signing surfaces may transmit information related to which surface is being signed. For example, a user may record their template signature on the top right corner of the device. If an unauthorized entity attempts to replicate a signature with similar characteristic information but on the back cover instead of the top right corner, the entity would not be authenticated. In this way, the orientation of the device can provide an additional level of security.

In an additional embodiment, a signature input on the device can be displayed on the display of the device or another screen or monitor associated with the device.

If desired, the stylus 200 may also optionally include a stylus operating circumstance sensor 205 that also operably couples to the control circuit 202. An example of a stylus operating circumstance sensor 205 includes, for example, an accelerometer, a tilt detector, and so forth. So configured, the control circuit 202 can be configured to detect one or more stylus operating circumstances (such as, but not limited to, an angle of inclination of the stylus 200, rotation of the stylus 200 about its longitudinal axis, and so forth).

With continued reference to FIGS. 1 and 2, such a control circuit 202 can, at 101, detect a user's gesture with respect to the stylus 200. The present teachings are highly flexible in these regards and will accommodate a wide variety of user gestures. The gesture of the user indicates the stylus is being used to write with and data detection then begins. This distinguishes any general movement of the stylus from being considered a characteristic.

Returning to FIGS. 1 and 2, this process 100 will accommodate at 102, detecting at least one stylus characteristic (using, for example, the aforementioned stylus operating circumstance sensor 205). As one simple, non-limiting example in these regards, the detected stylus operating circumstance could comprise, at least in part, an angle of inclination of the stylus 200 (with respect to, for example, the scribing surface upon which the stylus 200 moves). Where a given gesture might indicate that a line thickness is to change, the tilt of the stylus 200 could serve, for example, to indicate an amount by which the line thickness is to increase or decrease (either in absolute terms or in relative terms as desired).

At 103 the control circuit 202 transmits information regarding the stylus input. The information is transmitted to a host authentication device. The host authentication device may be connected by a wire connection to the stylus, or it may be in wireless communication with the stylus. The wireless communication may be over Bluetooth™.

The input information is transmitted, by the stylus, in a highly securable file that may include cyclic redundancy checks (CRC) to ensure the integrity of the data. Authentication may be done on the host level to verify the information has been received and is complete. The security of the file is important to prevent the file from being accessed by third parties. In the case of transmitting the file wirelessly to the host device, it is also necessary to provide identification information such that the stylus file is not incorrectly transmitted to a host device that is different from the intended one.

Figure 3:
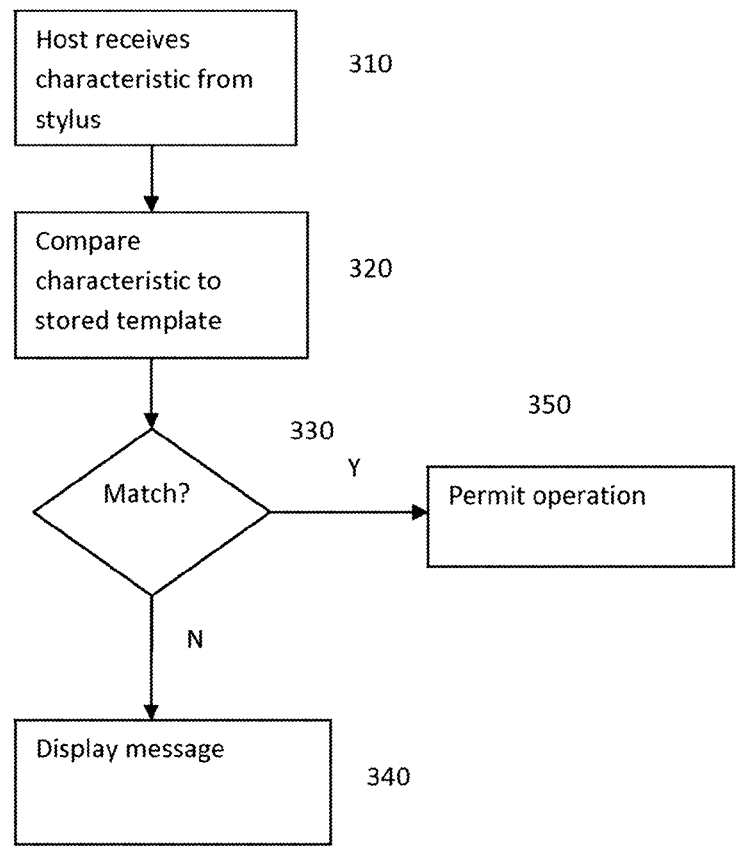
FIG. 3 is a flow diagram illustrating a method of the host, in accordance with an embodiment of the present disclosure.

Referring to FIG. 3, the host receives the transmitted file containing the characteristic from the stylus 310. The host then compares the received characteristics to a predefined stored template or value 320. If a match 330 is determined to exist, within reasonable tolerances in the security field of art, a match is verified and the action desired by the stylus 350 will be permitted to be performed. A graphical display to indicate success of the verification may be displayed to the user. The action could be a financial transaction that the user is using the stylus to sign for, it could be receiving a shipment, or any other application of writing or signing that requires rapid authentication. It could also be an action to unlock the host device, and once the template is verified, device becomes unlocked. Any application in which a password is typically required can be replaced by this method of authentication. In case the characteristic of the signature does not match the template, a display message 340 may be displayed. This display message could include an alert indicating the user is not the authorized user or it could display a warning requesting the user to try again.

An additional embodiment comprising a higher level of security includes storing the predefined template on the remote server. The remote server would perform the validation of the signature upon request. This results in an additional level of security because the predefined signature would be protected against theft, alternation or reproduction. This embodiment also permits a user to sign from multiple terminals such as, but not limited to, a tablet, a smartphone, a personal computer, or others. The stored template would not be on the local device therefore the authentication would not be limited to a single device.

Figure 4:
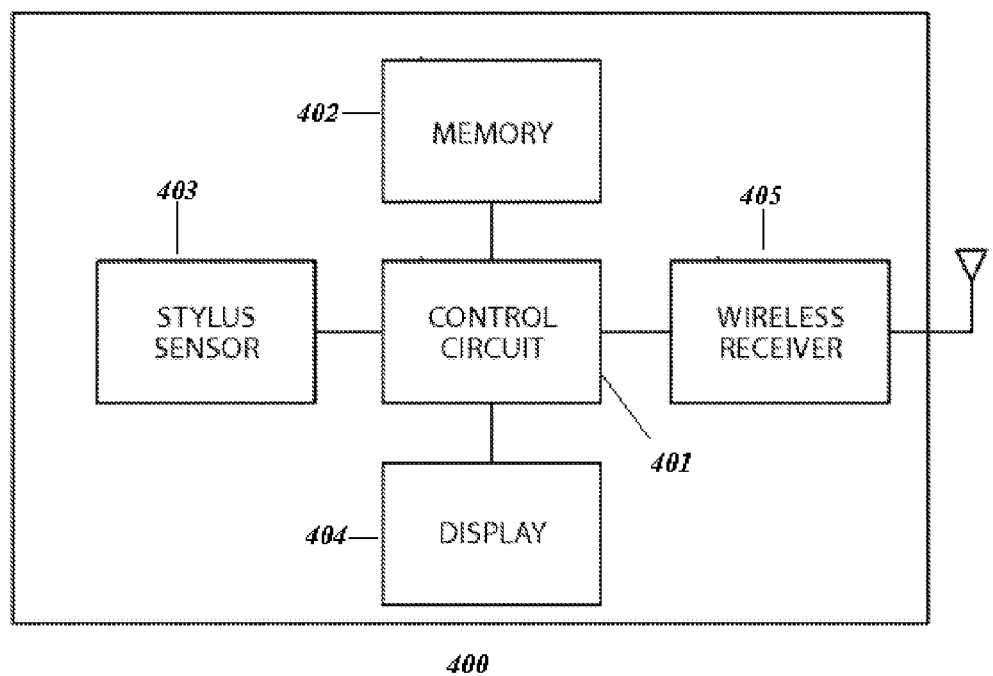
FIG. 4 is a block diagram of an example of a host, in accordance with an embodiment of the present disclosure.

Referring to FIG. 4, a given electronic device 400 can be configured to receive and utilize the aforementioned transmission. Such a device 400 can include its own control circuit 401 that operably couples to a memory 402, a stylus sensor 403, a display 404, and a wireless receiver 405. The stylus sensor 403 can serve, for example, to detect and track the stylus's contact with and movement across a given scribing surface. An example of a stylus sensor is a digitizer. The control circuit 401 can then provide a corresponding presentation of electronic ink on the display 404 that correlates to that tracked contact/movement. Such practices are known in the art. Accordingly, further elaboration in these regards here will not be provided for the sake of brevity.

The wireless receiver 405 is configured in this example to compatibly receive the transmissions of the aforementioned wireless transmitter 206. When the wireless transmitter 206 comprises a Bluetooth™-compatible transmitter, for example, the wireless receiver 405 can itself comprise a Bluetooth™-compatible receiver.

The control circuit 401 of this device 400 can be configured to interpret the received signals from the stylus 200 as regards the aforementioned detected gestures to thereby facilitate an additional user-input modality by which the user can control, influence, and effect, for example, the ways by which the device 400 interprets and utilizes stylus-based scribing input.

The user sensor 204 can include an accelerometer in the stylus and may be used to capture tilt angle, acceleration, duration and palm resting time. The accelerometer may be a real-time sensor which can capture various stylus related parameters such as, but not limited to, pressure imparted from the stylus to a touch-sensitive surface. The pressure may be imparted while the user of the stylus signs in a manner analogous to a handwritten signature. Pressure may also include force. Potential pressure sensors that may be used to detect pressure and force include piezo sensors, resistive inks, resistive carbon, strain gauge, barometer sensors, gauge pressure sensors, optical-mechanical sensors and other sensors that would be known to a person skilled in the art.

As a security feature, the stylus related parameters or characteristics may then be stored and transmitted to a host. The host may be a handheld mobile device, a server, or any additional location where a predefined template is stored. Other types of user sensors 204 that could be used in the stylus to capture characteristic information include 3-dimensional sensors such as gyroscopes which can capture rotation, and magnetometers. The use of a magnetometer may assist a gyrometer and accelerometer in making improved measurements. A magnetometer can provide more accuracy, and calibration or re-calibration of the accelerometer and gyrometer. This is because the magnetic field of the earth will always be known and so the determination of the tilt angle, for example, with respect to a surface can be more accurately determined with the assistance of the magnetic field.

One characteristic includes, but is not limited to, the trajectory of the stylus tip tracking the signature. Typical position sensors are able to capture displacement, however the use of additional 3-dimensional sensors may work in co-ordination with the position sensors to increase the accuracy of position sensors.

Acceleration and deceleration of the stylus as the user proceeds to sign may also be captured by accelerometers. These characteristics may be a function of the size of a user's hand, whether the user is right or left handed, as well as the uniqueness of their handwritten signature. All of this information may be captured by the accelerometer and subsequently compared to a stored template.

Accelerometer measurements are made with respect to an arbitrary frame of reference of the stylus so a gyroscope may be used to assist in mapping accelerometer measurements onto a fixed frame of reference prior to single integration for velocity and double integration for position measurements. By using a 3-dimensional gyroscope, a 3-dimensional rotation matrix may be maintained which is multiplied against the accelerometer measurements in order to resolve them on a fix frame of reference. This may be chosen as the orientation of the stylus at the initial point of the signature input motion. Since the duration of the signature is generally within a few seconds, this brief duration allows for limited time for integration errors to build.

Single integration provides velocity information, which is the most valuable data from the dead reckoning sensors, and also provides less integration error than the errors inherent with double integration.

The results of double integration to get position may be blended with the trajectory of the tip of the stylus that has been captured by other means. Typically, a user may lift the stylus between letters, to dot or cross a letter, or underline. Therefore additional information may also be captured on the z-axis.

Another characteristic to be captured may be the stylus tip pressure. Typically, the residue of the pressure related information is what graphologists look for when analyzing handwritten signatures on paper. The pressure history of a signature, may therefore be an additional unique characteristic that can be captured by an individual's signature written in real-time.

One advantage of this method of authentication is the significantly reduced likelihood of a forged signature. Since multiple parameters may be obtained and saved to accurately capture a users signature, it would require many hours of practice to replicate all of the variables. The likelihood of replicating all of the parameters in real-time is reduced. Therefore, extraction of multiple characteristics from sensors results in increased insight that graphologists would be unable to obtain through handwriting analysis.

In addition to individual characteristics being stored and transmitted, profiles may be created which incorporates multiple characteristics into a single profile. Examples of profiles may be dynamic force profiles, pressure profiles, tilt angle profiles, acceleration profiles, position profiles, rotation profiles or velocity profiles. A characteristic may be defined as a measurement taken at a single point in time or space, whereas as a profile refers to characteristics recorded across an extended time period or distance. Distance can be along the complex trajectory of the stylus tip, or between the start and end of the whole signature trajectory.

A component of the position profile may also indicate the time duration of active input entry. This may be shown by the control circuitry removing the time segments during which the user pauses. An additional component of the position profile may indicate the time duration of input inactivity during input entry. This may be shown by the control circuitry removing the time segments during which the user is writing and only indicating the time duration during which the user pauses.

Various characteristics of a signature may be captured individually or collectively. A plurality of characteristics form a profile. These characteristics may be compiled together to form a profile and then recorded by the internal circuitry of the stylus 205 collectively and transmitted to the host together for comparison to a stored profile.

The dynamic force profile may be saved when the user imposes a force on the stylus tip while writing the signature. In this case, the stylus circuit will record how much force is input on the signature at different positions while signing. This could be emitted based on letters or curves of the signature, and segments of distance on the surface or force per unit time.

A profile may also be defined in terms of tilt angle of the stylus. While the stylus is being held in the users hand, there is an angle of incidence between the tip of the stylus and the writing surface. This angle can be saved as a characteristic at a point in time, or the tilt angle profile can be defined by a set of tilt angle characteristics recorded over a distance or a time interval.

Acceleration or velocity profiles of the stylus may be saved. The acceleration and velocity measurements may be recorded by the stylus at individual positions as the stylus is moving across the surface, per distance or per unit in time, thus defining an acceleration profile or a velocity profile.

The profile may also be defined in terms of time. Either the time duration of the signature while the stylus is active can be recorded, or the time duration of the signature while the palm is in a resting state can be saved. Individuals will typically take varying amounts of time while writing and while pausing when completing a signature. All of these time measurements may be captured for comparison to the pre-defined template.

After recording the characteristics or profiles, the stylus relays the data by transmitting it to a host device for authentication. The host device may comprise a tablet, a server, or a database. When the recorded data is transmitted to the host, it proceeds to retrieve a stored template of information. The information contained in the template is compared to the characteristic or profile information that was obtained from the stylus. If the template information matches the stylus information, the user has been successfully authenticated and the operation may be permitted.

The transmitted characteristic received by the host may include a transmitted velocity of the input, a transmitted pressure of the input, a profile defining a dynamic force profile, a tilt angle profile, an acceleration profile, and a position profile. The position profile may include an indication of the time duration of active input entry and a time duration of input inactivity during which the user is not actively signing.

Optionally, additional characteristics could be stored as part of the signature template as well as the received signature. Examples of additional characteristics include date and location. The location can be obtained via a GPS on the host device, triangulation based on signal strength of surrounding radio towers, user input through an interface on the host, or any other means that enables the device to record the current location of the device.

The combination of the characteristics of location and date, with appropriate corresponding hardware sensors that a person skilled in the art would know how to add in order to test these conditions. would enable additional parameters to be derived from these characteristics. For example, if the signature was signed outside, environmental conditions at the location and at the time of the signature could be incorporated. These conditions may include altitude, atmospheric pressure, humidity coefficient, sunny conditions, cloudy conditions, and precipitation. The presence or absence of specific features within a specific range allows for tolerances in distinguishing characteristics of the profile.

Typically, during the time it takes for a user to sign their sign signature, atmospheric pressure does not fluctuate. Therefore, for the purpose of handwriting analysis, it would be possible to use an absolute pressure sensor such as a barometer to determine the pressure applied by the stylus during signing.

Since factors including location and environmental conditions would be considerably more difficult to impersonate, incorporating such factors provides an additional and robust method of validating an authentic signature.

The stylus may be connected by a wire to the host. In this case, the data transfer is direct and immediate. The host contains the stored template information and performs the authentication is real time. The stylus may also transmit the characteristic information wirelessly to a host that is not directly connected. A wireless transfer is done over an active link and a decoder is used to decode a signal from a shortrange technology, such as Bluetooth™ signal. In addition, there is a difference between rotation and tilt in capturing information related to a signature. Character analysis is also an important distinguishing factor as the direction which a user writes can be taken into account. A signature may be passive, that is the letters are slanting backwards, aggressive with forward slanting letters, cautious with the signature restricted to an imaginary line, intelligent with few lifts of the stylus and consistent letter flow. Similar categories known in the field of character analysis may be defined and such intelligent analysis can be added to the algorithm for tracking the security of signature.

FIG. 5A-5F illustrate graphically examples of various characteristics for a signature, plotted in a characteristic versus time for the signature. FIGS. 5A to 5F shows the characteristics in the x-direction, however similar data for the y- and z-directions could also be plotted. Additional characteristics obtained and incorporated into a signature profile enhance the security level. For example, if only the position in the x-direction is compared, there is a minimum level of security present that could be copied. However if additional information in the y- and z-directions are also recorded, the chances of copying this information is significantly reduced.

Different security levels may be defined depending on the minimum number of security levels required. If a higher level security is required, a predefined threshold such as 10 characteristics may be required. If a lower level of security is required, perhaps only verification of 2 characteristics are sufficient. The minimum security level may be defined by an administrator policy or could be selected by a user.

The digital measurements recorded can be reconstructed into an example signature as well. Each of the measurements can also be stored within an acceptable tolerance level. The tolerance can also be different for each characteristic.

FIG. 5A-5F illustrate examples of what digital measurements are stored in a database to compare against an input signature. The computer plots electronically characteristics that define a human signature profile. A profile may be a single characteristic or a combination of a plurality of characteristics.

Figure 5A:
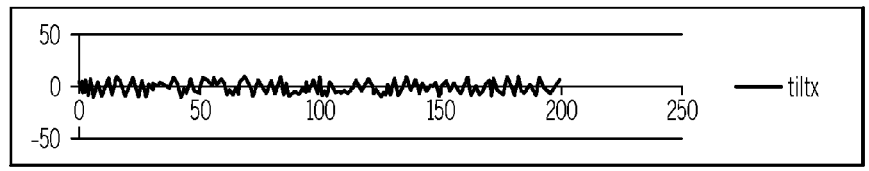
FIG. 5A is a graphical illustration of the x-component of tilt information vs time, in accordance with an embodiment of the present disclosure.

FIG. 5A illustrates the x-component of the tilt angle as it changes through the time it takes a person to sign. If an unauthorized person attempted to replicate a signature with a different tilt in the x-direction, the algorithm would not match the attempt with the template and access would be denied.

Figure 5B:
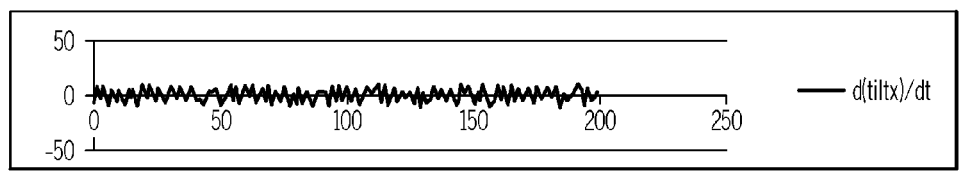
FIG. 5B is a graphical illustration of the first derivative of the x-component of tilt information vs time, in accordance with an embodiment of the present disclosure.

FIG. 5B illustrates the x-component of the first derivative of the tilt angle as it changes through time. This is a calculated value determined from the measured value shown in FIG. 5A.

Figure 5C:
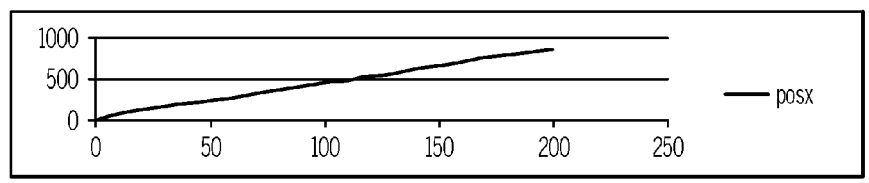
FIG. 5C is a graphical illustration of the x-component of position information vs time, in accordance with an embodiment of the present disclosure.

FIG. 5C illustrates the x-component of the position of the stylus as the user signs the signature on the paper. Similar values in the y-direction may indicate the height of a letter and in the z-direction may indicate if a user crossed or dotted a letter.

Figure 5D:
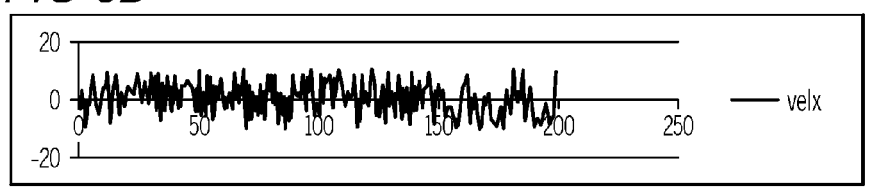
FIG. 5D is a graphical illustration of the x-component of velocity information vs time, in accordance with an embodiment of the present disclosure.

FIG. 5D illustrates the x-component of the velocity of the stylus as it changes through time. This shows the speed at which the user signs their name.

Figure 5E:
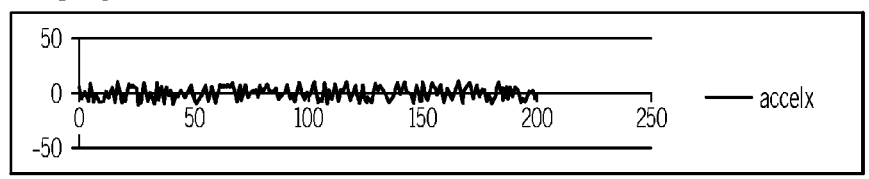
FIG. 5E is a graphical illustration of the x-component of acceleration vs time, in accordance with an embodiment of the present disclosure.

FIG. 5E illustrates the x-component of the acceleration of the stylus as it changes through time. This shows the rate at which the user speeds up or slows down the signing of their name.

Figure 5F:
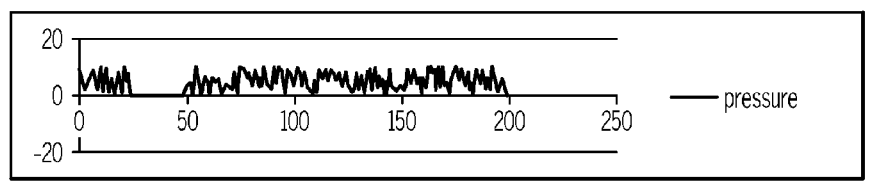
FIG. 5F is a graphical illustration of pressure information vs time, in accordance with an embodiment of the present disclosure.

FIG. 5F illustrates the pressure of the stylus as a user presses on the surface while signing. The host can include a smartphone, tablet, superphone, a device that has the ability to navigate using a trackpad, or any other type of electronic device.

Figure 6:
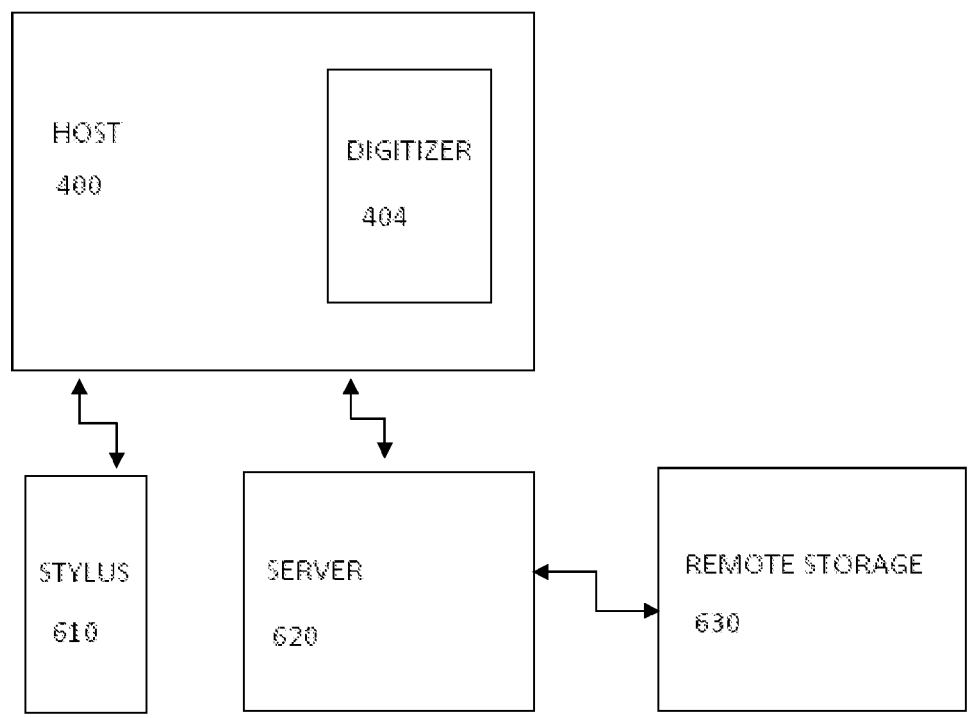
FIG. 6 is a block diagram of a system, in accordance with an embodiment of the present disclosure.

FIG. 6 is an example of the system which includes the host 400 incorporating the stylus sensor, specifically a digitizer 404 for tracking the characteristics of the stylus 610. The stylus 610 is in wireless communication with the host 400. The host may also transmit and receive information with a server 620. The server 620 may store information such as a template to compare the received signature with. If the template stored on the server 620 matches the information transmitted from the stylus 610 and received by the host 400, then the signature will be authenticated. It is also possible for additional information including signature templates to be stored in a remote storage location 630, such as a cloud. In this case, the server 620 will access the remote storage 630 to authenticate a received signature from the information transmitted by the stylus 610 through the host 400.

Figure 7:
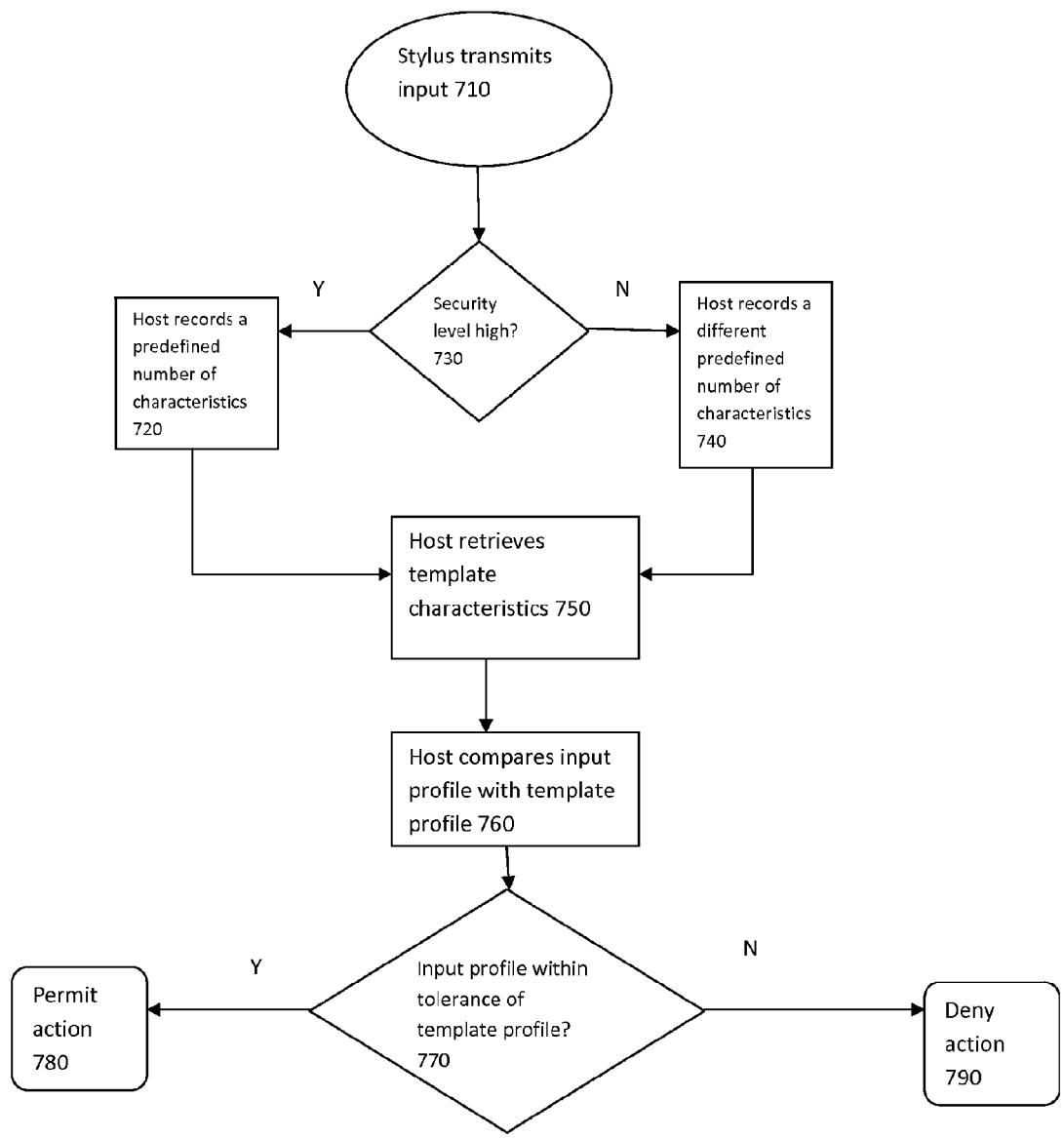
FIG. 7 is a flow chart of a method of the system based on a security level.

FIG. 7 illustrates an algorithm performed by the system to verify the characteristics based on a desired security level. Firs the stylus transmits the input received by the signing, 710. The desired security level is determined, it may be predefined in categories or based on the desired number of matching characteristics. In this example, a determination is made 730 if the security level is "high". If it is high 720, the host records a predefined number of characteristics that correspond to the desired level. If the level is not high 740, the host records a different number of characteristics, where the number recorded at 740 is less than that would be recorded at 720.

The host then retrieves the template characteristics 750 that may be stored in remote storage 630. The host compares the input profile values with the template profile 760 and determines if the input is within an acceptable tolerance of the template 770. If the input is within the tolerance, the action is permitted 780. If the input is not within the acceptable tolerance of the template 780, the action is denied.

As understood by a person skilled in the art, a plurality of characteristics may form a profile. The template profile may be compared to the input profile insofar as the same types of characteristics are being compared. For example, if the security level indicates pressure is not to be compared, the template profile related to pressure would not be accessed.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

The invention claimed is:

1. A method, comprising:
   receiving an input signature from a contact point of a stylus at a touch-sensitive surface of an input receiving device as the stylus is used to sign a user's name;
   detecting, based on a present security level being a first security level, a first set of characteristics of the input signature by at least one sensor that represents how the stylus is used to sign the user's name;
   detecting, based on the present security level being a second security level, a second set of characteristics of the input signature by at least one sensor that represents how the stylus is used to sign the user's name, the second set of characteristics being a subset of the first set comprising fewer characteristics than the first set; and
   transmitting one of the first set of characteristics or the second set of characteristics to a characteristic receiving device to permit the input signature to be authenticated as a function, at least in part, of the first set or the second set of characteristics.

2. The method of claim 1, wherein the at least one sensor comprises a magnetometer, and wherein at least one of the first set of characteristics or the second set of characteristics comprises measurements made by the magnetometer and at least one of a location measurement of the stylus or an acceleration measurement of the stylus.

3. The method of claim 1, wherein at least one of the first set of characteristics or the second set of characteristics comprises an amount of rotation of the stylus around a longitudinal axis of the stylus while the stylus is used to sign the user's name.

4. The method of claim 1, wherein at least one of the first set of characteristics or the second set of characteristics comprises a geographic location of the stylus where the stylus is used to sign the user's name.

5. A method comprising:
   determining a present security level for a present authentication is one of plurality of levels comprising at least a first level and a second level;
   receiving, by a host device, a plurality of transmitted characteristics generated by a control circuit of a stylus, the plurality of transmitted characteristics representing how the stylus is used to sign a user's name;
   authenticating a signature as entered by the user, the authenticating being based on:
      determining, based on the present security level being the first level, that a first set of characteristics in the plurality of transmitted characteristics corresponds to a stored first set of values for the first set of characteristics; and
      determining, based on the present security level being the second level, that a second set of characteristics within the plurality of transmitted characteristics corresponds to a stored second set of values for the second set of characteristics, the second set of characteristics being a subset of the first set comprising fewer characteristics than the first set; and
   performing an action based on the authentication.

6. The method of claim 5, wherein the plurality of transmitted characteristics comprises at least one of a transmitted velocity as corresponds to when the stylus is used to sign the user's name or a transmitted pressure as corresponds to when the stylus is used to sign the user's name.

7. The method of claim 5, wherein the transmitted characteristics comprise a magnetometer reading, and wherein at least one of the stored first set of values or the stored second set of values comprises values of measurements made by the magnetometer and at least one of a value of a location measurement of the stylus or a value of an acceleration measurement of the stylus.

8. The method of claim 5, wherein the transmitted characteristics comprise an amount of rotation of the stylus around a longitudinal axis of the stylus while the stylus is used to sign the user's name, and wherein at least one of the stored first set of values or the stored second set of values comprises an amount of rotation of the stylus around a longitudinal axis of the stylus.

9. The method of claim 5, wherein the transmitted characteristics comprise a location of the signature on a touch-sensitive surface, and wherein at least one of the stored first set of values or the stored second set of values comprises a value of a location of the signature on the touch-sensitive surface.

10. The method of claim 5, wherein the transmitted characteristics comprise a geographic location of an input receiving device where the stylus is used to sign the user's name, and wherein at least one of the first set of values or the second set of values comprises a value of a geographic location.

11. A stylus comprising
    a stylus barrel;
    at least one sensor supported by the stylus barrel configured to detect at least one characteristic of an input signature associated with use of the stylus from a contact point of the stylus with a surface, wherein the at least one sensor comprises one of an accelerometer or a gyroscope;

a transmitter supported by the stylus barrel; and a control circuit supported by the stylus barrel and operably coupled to both the at least one sensor and the transmitter, the control circuit configured to:

receive the input signature;

detect, based on a present security level being a first security level, a first set of characteristics of the input signature by the at least one sensor that represents how the stylus is used to sign the user's name;

detect, based on the present security level being a second security level, a second set of characteristics of the input signature by the at least one sensor that represents how the stylus is used to sign the user's name, the second set of characteristics being a subset of the first set comprising fewer characteristics than the first set; and transmit one of the first set of characteristics or the second set of characteristics to a characteristic receiving device to permit the input signature to be authenticated as a function, at least in part, of the first set or the second set of characteristics.

12. The stylus of claim 11, wherein the at least one sensor comprises a magnetometer, and wherein at least one of the first set of characteristics or the second set of characteristics comprises measurements made by the magnetometer and at least one of a location measurement of the stylus or an acceleration measurement of the stylus.

13. The stylus of claim 11, wherein at least one of the first set of characteristics or the second set of characteristics comprises a geographic location of the stylus where the stylus is used to sign the user's name.

14. An electronic device comprising a memory and a processor configured to:

determine a present security level for a present authentication is one of plurality of levels comprising at least a first level and a second level;

receive, by a host device, a plurality of transmitted characteristics generated by a control circuit of a stylus, the plurality of transmitted characteristics representing how the stylus is sued to sign the user's name;

authenticate a signature received from the user, the authenticating being based on:

determining, based on the present security level being the first level, that a first set of characteristics in the plurality of transmitted characteristics corresponds to a stored first set of values for the first set of characteristics; and determining, based on the present security level being the second level, that a second set of characteristics within the plurality of transmitted characteristics corresponds to a stored second set of values for the second set of characteristics, the second set of characteristics being a subset of the first set comprising fewer characteristics than the first set; and performing an action based on the authentication.

15. The electronic device of claim 14, wherein the plurality of transmitted characteristics comprises at least one of a transmitted velocity as corresponds to when the stylus is used to sign the user's name or a transmitted pressure as corresponds to when the stylus is used to sign the user's name.

16. The electronic device of claim 14, wherein the transmitted characteristics comprise a geographic location of an input receiving device where the stylus is used to sign the user's name, and wherein at least one of the stored first set of values or the stored second set of values comprises a geographic location.

17. A non-transitory computer readable medium having instructions executable by a processor, the instructions comprising instructions configured to:

receive an input signature from a contact point of a stylus at a touch-sensitive surface of an input receiving device as the stylus is used to sign a user's name;

detect, based on a present security level being a first security level, a first set of characteristics of the input signature by at least one sensor that represents how the stylus is used to sign the user's name;

detect, based on the present security level being a second security level, a second set of characteristics of the input signature by at least one sensor that represents how the stylus is used to sign the user's name, the second set of characteristics being a subset of the first set comprising fewer characteristics than the first set; and transmit one of the first set of characteristics or the second set of characteristics to a characteristic receiving device to permit the input signature to be authenticated as a function, at least in part, of the first set or the second set of characteristics.

18. The non-transitory computer readable medium of claim 17, wherein the at least one sensor comprises a magnetometer, and wherein at least one of the first set of characteristics or the second set of characteristics comprises measurements made by the magnetometer and at least one of a location measurement of the stylus or an acceleration measurement of the stylus.

19. The non-transitory computer readable medium of claim 17, wherein at least one of the first set of characteristics or the second set of characteristics comprises an amount of rotation of the stylus around a longitudinal axis of the stylus while the stylus is used to sign the user's name.

20. The non-transitory computer readable medium of claim 17, wherein at least one of the first set of characteristics or the second set of characteristics comprises a geographic location of the stylus where the stylus is used to sign the user's name.

21. A non-transitory computer readable medium having instructions executable by a processor, the instructions comprising instructions configured to:

determine a present security level for a present authentication is one of a plurality of levels comprising at least a first level and a second level;

receive, by a host device, a plurality of transmitted characteristics generated by a control circuit of a stylus, the plurality of transmitted characteristics representing how the stylus is used to sign the user's name;

authenticate a signature as entered by the user, the authenticating being based on:

determining, based on the present security level being the first level, that a first set of characteristics in the plurality of transmitted characteristics corresponds to a stored first set of values for the first set of characteristics; and determining, based on the present security level being the second level, that a second set of characteristics within the plurality of transmitted characteristics corresponds to a stored second set of values for the second set of characteristics, the second set of characteristics being a subset of the first set comprising fewer characteristics than the first set; and perform an action based on the authentication.

22. The non-transitory computer readable medium of claim 21, wherein the plurality of transmitted characteristics comprises at least one of a transmitted velocity as corresponds to when the stylus is used to sign the user's name or a transmitted pressure as corresponds to when the stylus is used to sign the user's name.

23. The non-transitory computer readable medium of claim 21, wherein the transmitted characteristics comprise a magnetometer reading, and wherein at least one of the stored first set of values or the stored second set of values comprises measurements made by the magnetometer and at least one of a value of a location measurement of the stylus or a value of an acceleration measurement of the stylus.

24. The non-transitory computer readable medium of claim 21, wherein the transmitted characteristics comprise an amount of rotation of the stylus around a longitudinal axis of the stylus while the stylus is used to sign the user's name, and wherein at least one of the stored first set of values or the stored second set of values comprises a value of an amount of rotation of the stylus around a longitudinal axis of the stylus.

25. The non-transitory computer readable medium of claim 21, wherein the transmitted characteristics comprise a geographic location of the input receiving device where the stylus is used to sign the user's name, and wherein at least one of the stored first set of values or the stored second set of values comprises a value of a geographic location.

\* \* \* \* \*

UNITED STATES PATENT AND TRADEMARK OFFICE
CERTIFICATE OF CORRECTION

| | | |
|---|---|---|
| PATENT NO. | : 9,600,729 B2 | Page 1 of 1 |
| APPLICATION NO. | : 15/063100 | |
| DATED | : March 21, 2017 | |
| INVENTOR(S) | : Jacek Idzik et al. | |

It is certified that error appears in the above-identified patent and that said Letters Patent is hereby corrected as shown below:

In the Claims

In Column 13, Line 43, delete "sued" and insert -- used --

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*